United States Patent [19]

Singh et al.

[11] Patent Number: 5,294,359
[45] Date of Patent: Mar. 15, 1994

[54] REFRIGERANT COMPOSITIONS

[75] Inventors: Rajiv R. Singh, Williamsville; David P. Wilson, East Amherst; Earl A. E. Lund, West Seneca; Ian R. Shankland, Williamsville, all of N.Y.

[73] Assignee: AlliedSignal Inc., Morristownship, N.J.

[21] Appl. No.: 829,652

[22] Filed: Feb. 3, 1992

[51] Int. Cl.$^5$ ............................................... C09K 5/04
[52] U.S. Cl. .......................................... 252/67; 62/114
[58] Field of Search ............................. 252/67; 62/114

[56] References Cited

U.S. PATENT DOCUMENTS

| | | | |
|---|---|---|---|
| 4,174,295 | 11/1979 | Bargigia | 252/90 |
| 4,439,343 | 3/1984 | Albanese | 252/90 |
| 4,482,465 | 11/1984 | Gray | 252/67 |
| 4,783,276 | 11/1988 | Bohnenn | 252/67 |
| 4,810,403 | 3/1989 | Bivens et al. | 252/67 |
| 4,971,712 | 11/1990 | Gorski et al. | 252/52 A |
| 4,978,467 | 12/1990 | Shankland et al. | 252/69 |
| 5,035,823 | 7/1991 | Tamura et al. | 252/67 |
| 5,062,985 | 11/1991 | Takemasa | 252/67 |

FOREIGN PATENT DOCUMENTS

| | | |
|---|---|---|
| 0430169 | 6/1991 | European Pat. Off. . |
| 0430170 | 6/1991 | European Pat. Off. . |
| 0443912 | 8/1991 | European Pat. Off. . |
| 9113968 | 9/1991 | European Pat. Off. . |
| 0451692 | 10/1991 | European Pat. Off. . |
| 79288 | 3/1989 | Japan . |
| 1-108291 | 4/1989 | Japan . |
| 3-170586 | 7/1991 | Japan . |

OTHER PUBLICATIONS

Derwent Primary Abstract, Accession No. 91-165716/23, Jul. 1991.
Derwent Primary Abstract, Accession No. 91-262358/36, Jul. 1991.
DataBase WPIL Week 9136, Derwent Publications Ltd., London, GB; AN 91-262357, JPA 3 170 586 (Matsushita) Jul. 24, 1991.
Patent Abstracts of Japan vol. 15, No. 413, JPA 31 70 587 (Matsushita Electric Ind.) Jul. 24, 1991.
Patent Abstracts of Japan vol. 15, No. 421, JPA 31 72 385 (Matsushita Electric Ind.), Jul. 25, 1991.

*Primary Examiner*—Christine Skane
*Attorney, Agent, or Firm*—J. P. Friedenson; K. A. Harding

[57] ABSTRACT

Compositions comprising difluoromethane, 1,1,1,2-tetrafluoroethane and a member selected from the group consisting of 1,1-difluoroethane, 1,1,1-trifluoroethane, propane and dimethyl ether having a vapor pressure from about 12.2 psia to about 18.4 psia at −40° F., are useful as refrigerants.

5 Claims, No Drawings

REFRIGERANT COMPOSITIONS

BACKGROUND OF THE INVENTION

Fluorocarbon based fluids have found widespread use in industry for refrigeration, air conditioning and heat pump applications.

Vapor compression cycles are one common form of refrigeration. In its simplest form, the vapor compression cycle involves changing the refrigerant from the liquid to the vapor phase through heat absorption at a low pressure, and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

The art is continually seeking new fluorocarbon based fluids which offer alternatives for refrigeration and heat pump applications. Currently, of particular interest, are fluorocarbon based mixtures which are considered to be environmentally acceptable substitutes for the presently used chlorofluorocarbons. The latter, such as monochlorodifluoromethane (HCFC-22) are suspected of causing environmental problems in connection with the earth's protective ozone layer.

The substitute materials must also possess those properties unique to the chlorofluorocarbons including similar refrigeration characteristics, chemical stability, low toxicity, non-flammability, efficiency in-use and low temperature glides.

By "similar refrigeration characteristics" is meant a vapor pressure which is plus or minus 20 percent of the reference refrigerant at the same temperature.

The characteristic of efficiency in-use is important, for example, in air conditioning and refrigeration where a loss in refrigerant thermodynamic performance or energy efficiency may have secondary environmental impacts through increased fossil fuel usage arising from an increased demand for electrical energy.

Low temperature glides have the following described significance. The condensation and evaporation temperatures of single component refrigerant fluids are defined clearly. If the small pressure drops in the refrigerant lines are ignored, the condensation or evaporation occurs at a single temperature corresponding to the condenser or evaporation pressure. For mixtures employed as refrigerants, there is no single phase change temperature but a range of temperatures. This range is governed by the vapor-liquid equilibrium behavior of the mixture. This property of mixtures is responsible for the fact that when non-azeotropic mixtures are used in the refrigeration cycle, the temperature in the condenser or the evaporator has no longer a single uniform value, even if the pressure drop effect is ignored. Instead, the temperature varies across the equipment, regardless of the pressure drop. In the art this variation in the temperature across an equipment is known as temperature glide.

For non-isothermal heat sources and heat sinks, this temperature glide in mixtures can be utilized to provide better efficiencies. However in order to benefit from this effect, the conventional refrigeration cycle has to be redesigned, see for example T. Atwood "NARBs—The Promise and the Problem", paper 86-WA/Ht-61 American Society of Mechanical Engineers. In most existing designs of refrigeration equipment, a temperature glide is a cause of concern. Therefore non-azeotropic refrigerant mixtures have not found wide use. An environmentally acceptable non-azeotropic mixture with a small temperature glide and with a similar refrigeration capacity to other known pure fluids, such as HCFC-22 would advance the art.

Difluoromethane (HFC-32) is considered to be environmentally acceptable and has been suggested as a refrigerant but it is known in the art to have too high a discharge temperature for direct use in simple machines and also is flammable.

1,1,1,2-Tetrafluoroethane (HFC-134a) is also considered to be an environmentally acceptable refrigerant but it is much less volatile than HCFC-22 and consequently offers a much lower refrigeration capacity than HCFC-22. Use of HFC-134a as an alternative for HCFC-22 would require significant and costly equipment redesign. Moreover, at lower evaporating temperatures HFC-134a exhibits a subatmospheric vapor pressure. System leaks would result in an influx of air causing performance and reliability deterioration.

Non-azeotropic blends of HFC-32 and HFC-134a have been disclosed as refrigerants (Japanese Patent Publication 1079-288A) but have unfavorable flammability characteristics. Dimethyl ether, 1,1,1-trifluoroethane (HFC-143a), 1,1-difluoroethane (HFC-152a) and propane are environmentally acceptable fluids which have been proposed as refrigerants, but are all extremely flammable.

DESCRIPTION OF THE INVENTION

In accordance with the invention, novel non-azeotropic compositions have been discovered comprising HFC-32, HFC-134a and a member selected from the group consisting of HFC-152a, HFC-143a, dimethyl ether and propane, having a vapor pressure of about 12.2 psia to about 18.4 psia at $-40°$ F.

When the selected member is HFC-152a, the compositions comprise from about 25 to about 60 mole percent HFC-32, from about 40 to about 75 mole percent HFC-134a and from about 1 to about 13 mole percent HFC-152a. The preferred compositions are from about 30 to about 50 mole percent HFC-32, from about 45 to about 60 mole percent HFC-134a, and from about 2 to about 7 mole percent HFC-152a.

When the selected member is HFC-143a, the compositions comprise from about 10 to about 60 mole percent HFC-32, from about 35 to about 75 mole percent HFC-134a and from about 1 to about 45 mole percent HFC-143a. The preferred compositions are from about 20 to about 45 mole percent HFC-32, from about 45 to about 60 mole percent HFC-134a and from about 5 to about 25 mole percent HFC-143a.

When the selected member is propane, the compositions comprise from about 25 to about 60 mole percent HFC-32, from about 40 to about 75 mole percent HFC-134a and from about 1 to about 6 mole percent propane. The preferred compositions are from about 30 to about 50 mole percent HFC-32, from about 45 to about 60 mole percent HFC-134a and from about 2 to about 4 mole percent propane.

When the selected member is dimethyl ether, the compositions comprise from about 25 to about 60 mole percent HFC-32, from about 40 to about 75 mole percent HFC-134a and from about 1 to about 9 mole percent dimethyl ether. The preferred compositions are from about 30 to about 50 mole percent HFC-32, from about 45 to about 60 mole percent HFC-134a and from about 2 to about 6 mole percent dimethyl ether.

The HFC-32, HFC-134a, HFC-152a, HFC-143a, dimethyl ether and propane components of the novel compositions of the invention are all known materials and are either commercially available or may be prepared by known methods. Preferably they should be used in sufficiently high purity so as to avoid the introduction of adverse influences upon the properties of the system.

Additional components may be added to the compositions to tailor the properties according to the need, for example, additional refrigeration components, hydrocarbons to aid oil solubility if not already present and additives, such as lubricants.

The novel compositions of the invention satisfy the above-identified objectives for being a replacement for HCFC-22. The compositions are generally non-flammable; however, certain compositions within the broad scope of the invention may be flammable and may be avoided if desired. Flammability may readily be measured by an ASTM E-681 apparatus. Calculation of the thermodynamic properties of these compositions show that the refrigeration performance is substantially the same as that of HCFC-22.

In addition to having zero ozone depletion potential and providing a good match for the capacity of HCFC-22, the novel compositions of the invention provide the additional advantages of having a higher critical temperature and lower compressor discharge temperature than HFC-32. The higher critical temperature translates to improved energy efficiency in a refrigeration or air conditioning cycle, especially at high condensing temperatures. The lower compressor discharge temperature provides increased compressor reliability. The temperature glide which occurs on evaporation and condensation with non-azeotropic refrigerants is smaller for the compositions of this invention than for the binary combination of HFC-32 and HFC-134a disclosed in the prior art.

In one process embodiment of the invention, the compositions of the invention may be used in a method for producing refrigeration which involves condensing a refrigerant comprising the compositions and thereafter evaporating the refrigerant in the vicinity of the body to be cooled.

In another process embodiment of the invention, the compositions of the invention may be used in a method for producing heating which involves condensing a refrigerant comprising the compositions in the vicinity of the body to be heated and thereafter evaporating the refrigerant.

EXAMPLE 1

The theoretical performance of a refrigerant at specific operating conditions can be estimated from the thermodynamic properties of the refrigerant using standard refrigeration cycle analysis techniques, see for example, "Fluorocarbons Refrigerants Handbook", Ch. 3, Prentice-Hall (1988), by R. C. Downing. The coefficient of performance, COP, is a universally accepted measure, especially useful in representing the relative thermodynamic efficiency of a refrigerant in a specific heating or cooling cycle involving evaporation or condensation of the refrigerant. In refrigeration engineering this term expresses the ratio of useful refrigeration to the energy applied by the compressor in compressing the vapor. The capacity of a refrigerant represents the volumetric efficiency of the refrigerant. To a compressor engineer this value expresses the capability of a compressor to pump quantities of heat for a given volumetric flow rate of refrigerant. In other words, given a specific compressor, a refrigerant with a higher capacity will deliver more cooling or heating power. A similar calculation can also be performed for non-azeotropic refrigerant blends.

Theoretical performance calculations for an air conditioning refrigeration cycle where the average temperature is typically 115° F. and where the average evaporator temperature is typically 40° F. are performed using these standard techniques. Isentropic compression and a compressor inlet temperature of 60° F. are assumed. Calculations show that blends of the current invention match the capacity of HCFC-22, offer very similar COPs (Coefficient of Performance) and exhibit discharge temperatures significantly lower than HFC-32 and advantageously lower than HCFC-22. The temperature glide is determined not to exceed 11° F. which is minor. According to the known art (D. A. Didion and D. B. Bivens "The role of Refrigerant Mixtures as Alternatives" in CFC's: Today's Options ... Tomorrow's Solutions, NIST, 1990) temperature glides of the order of 6° to 7° F. are minor. The temperature glide here is 9° to 11° F. Therefore the temperature glide of the compositions claimed herein is considered small in this art and need not pose a problem for conventional refrigeration units.

We claim:

1. Compositions comprising from about 25 to about 60 mole percent difluoromethane, from about 40 to about 75 mole percent, 1,1,1,2-tetrafluoroethane and from about 1 to about 9 mole percent dimethyl ether, having a vapor pressure from about 12.2 psia to about 18.4 psia at −40° F.

2. Compositions according to claim 1 consisting essentially of the components recited.

3. Compositions according to claim 1 comprising from about 30 to about 50 mole percent difluoromethane, from about 45 to about 60 mole percent 1,1,1,2-tetrafluoroethane and from about 2 to about 6 mole percent dimethyl ether.

4. The method for producing refrigeration which comprising condensing a composition of claim 1 and thereafter evaporating the composition in the vicinity of a body to be cooled.

5. The method for producing heating which comprises condensing a composition of claim 1 in the vicinity of a body to be heated and thereafter evaporating said composition.

* * * * *